United States Patent
Johnsrud

(10) Patent No.: US 9,914,400 B1
(45) Date of Patent: Mar. 13, 2018

(54) ROOFTOP CARGO LOADER

(71) Applicant: Ralph Johnsrud, Florence, MT (US)

(72) Inventor: Ralph Johnsrud, Florence, MT (US)

(*) Notice: Subject to any disclaimer, the term of this patent is extended or adjusted under 35 U.S.C. 154(b) by 0 days.

(21) Appl. No.: 15/712,467

(22) Filed: Sep. 22, 2017

(51) Int. Cl.
  *B60R 9/042* (2006.01)
  *B60R 9/048* (2006.01)
  *B60R 9/058* (2006.01)
  *B60R 9/045* (2006.01)

(52) U.S. Cl.
  CPC ............ *B60R 9/042* (2013.01); *B60R 9/045* (2013.01); *B60R 9/048* (2013.01); *B60R 9/058* (2013.01)

(58) Field of Classification Search
  CPC ................................................. B60R 9/042
  USPC ........................................ 224/310; 414/462
  See application file for complete search history.

(56) References Cited

U.S. PATENT DOCUMENTS

| | | | | |
|---|---|---|---|---|
| 3,480,166 A * | 11/1969 | Abbott | ............... | B60R 9/042 414/462 |
| 4,439,086 A * | 3/1984 | Thede | ............... | B60R 9/08 224/310 |
| 4,440,540 A * | 4/1984 | Gottlieb | ............... | A61G 3/0209 414/462 |
| 4,950,123 A * | 8/1990 | Brockhaus | ............... | B60P 1/00 224/403 |
| 5,346,355 A * | 9/1994 | Riemer | ............... | B60P 1/4435 224/310 |
| 5,360,150 A * | 11/1994 | Praz | ............... | B60R 9/042 224/280 |
| 5,454,684 A * | 10/1995 | Berens | ............... | B60P 1/04 296/26.1 |
| 5,673,831 A * | 10/1997 | Spratt | ............... | B60R 9/042 224/281 |
| 5,827,036 A * | 10/1998 | Steffes | ............... | A61G 3/0209 224/310 |
| 5,884,824 A * | 3/1999 | Spring, Jr. | ............... | B60R 9/042 224/309 |
| 6,099,231 A * | 8/2000 | Levi | ............... | B60R 9/0423 224/310 |
| 6,105,840 A * | 8/2000 | Trevino | ............... | B60R 9/042 224/309 |
| 6,158,638 A * | 12/2000 | Szigeti | ............... | B60R 9/042 224/310 |
| 6,428,263 B1 * | 8/2002 | Schellens | ............... | B60R 9/042 224/310 |
| 6,435,801 B2 * | 8/2002 | Talbott | ............... | B60P 1/4407 224/521 |
| 6,634,529 B2 * | 10/2003 | Choiniere | ............... | B60R 9/042 224/310 |
| 7,108,162 B2 * | 9/2006 | Stadler | ............... | B60R 9/042 224/310 |

(Continued)

*Primary Examiner* — Justin Larson

(57) ABSTRACT

A cargo loader including a base suitable to attach to a roof of a vehicle is disclosed. The cargo loader may include a linear guide having a first end and a second end. The first end of the linear guide is attached to the first portion of the base via a first rotational device. The second end of the linear guide is releasably attached to the second portion of the base. The cargo loader may include a cargo mount having first end and a second end. The first end of the cargo mount is unattached to the linear guide and the second end of the cargo mount is attached to the linear guide via a second rotational device. The cargo loader may include an energy transfer device attached to the second portion of the base and the cargo mount.

20 Claims, 13 Drawing Sheets

(56) References Cited

U.S. PATENT DOCUMENTS

| | | | | |
|---|---|---|---|---|
| 7,513,730 | B2* | 4/2009 | Goyanko | B60R 9/042 224/310 |
| 8,322,580 | B1* | 12/2012 | Hamilton | B60R 9/042 224/309 |
| 2002/0117523 | A1* | 8/2002 | Ketterhagen | B60R 9/042 224/310 |
| 2004/0052622 | A1* | 3/2004 | Chisnall | B60P 3/40 414/462 |
| 2005/0254925 | A1* | 11/2005 | Braquet | B60P 1/4414 414/462 |
| 2006/0099059 | A1* | 5/2006 | Ervin | B60R 9/042 414/462 |
| 2006/0120841 | A1* | 6/2006 | Meeks | B60P 1/4407 414/462 |
| 2006/0280583 | A1* | 12/2006 | Settelmayer | B60R 9/042 414/462 |
| 2007/0090139 | A1* | 4/2007 | McKenzie | B60R 3/005 224/310 |
| 2009/0140021 | A1* | 6/2009 | Richter | B60R 9/0423 224/310 |
| 2015/0069101 | A1* | 3/2015 | Presley | B60R 9/042 224/310 |

* cited by examiner

ROOFTOP CARGO LOADER

TECHNICAL FIELD

Implementations of the disclosure relate to the cargo systems and, in particular, to vehicle rooftop cargo loaders.

BACKGROUND

Transportation of cargo on the roof of a vehicle is a common activity performed by drivers. In some cases, carrying cargo on the roof of a vehicle frees space for passengers or other cargo within the vehicle. Rooftop cargo often includes luggage, bikes, skis, kayaks, canoes, among others.

BRIEF DESCRIPTION OF THE DRAWINGS

The disclosure is illustrated by way of example, and not by way of limitation, in the figures of the accompanying drawings.

DETAILED DESCRIPTION

Figure 1:
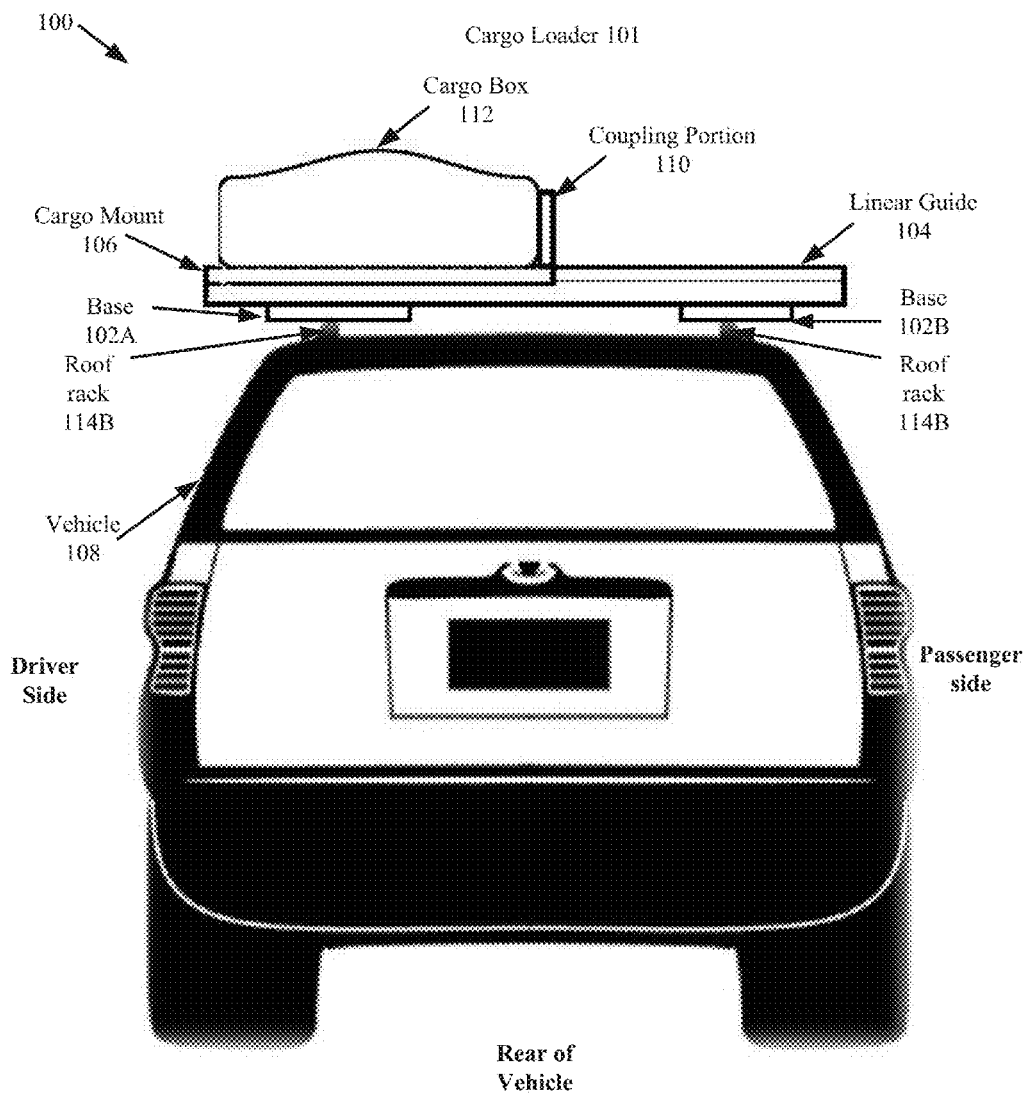
FIG. 1 illustrates a diagram of cargo loader in a mounted position, in accordance with some implementations of the disclosure.

In some rooftop cargo systems, a cargo container (such as a cargo box or sport rack) may be mounted to the roof of a vehicle using a roof rack. A roof rack may refer to framework or equipment for facilitating the mounting of other equipment, such as a cargo container, to the roof of a vehicle. For example, the roof rack may include two bars attached to specialized mounts that mount the roof rack to the roof of the vehicle. A cargo container may be a system for holding or securing cargo and may be mounted in some cases to a cargo rack.

Some rooftop cargo systems are fixedly attached to the roof of a vehicle. Accessing rooftop cargo systems and the cargo therein, may be particularly challenging. The cargo containers are often positioned overhead making the access to the cargo containers and cargo challenging. Users operating rooftop cargo systems that are fixedly attached to the roof of a vehicle often find themselves standing on the vehicle seats or door jams trying to load and unload heavy cargo from the rooftop cargo systems. Both the vehicle and the user's physical well-being are compromised by such operation. Operation of rooftop cargo systems may be particularly dangerous in icy conditions, in which rooftop cargo systems are frequently used.

Implementations of the disclosure address the above-mentioned and other challenges by disclosing a rooftop cargo loader that allows a user standing on the ground to adjust the position of the cargo container on rooftop cargo loader from the roof of the vehicle to an operational position at roughly chest level. The user may further return the rooftop cargo loader to the rooftop position with mechanical assistance and secure the rooftop cargo loader to the roof with a locking device.

In some implementations, the rooftop cargo loader (also referred to as "cargo loader" herein) includes a base. The base further includes a first portion and a second portion. The base is suitable to attach to a roof of a vehicle. For example, the base may attach to a conventional roof rack. The cargo loader also includes a linear guide. The linear guide further includes a first end (e.g., side of car and operator facing) and a second end (e.g., opposite side of car). The first end of the linear guide is attached to the first portion of the base via a first rotational device. The second end of the linear guide is releasably attached to the second portion of the base. The cargo loader also includes a cargo mount having a first end and a second end. The first end of the cargo mount is unattached to the linear guide. The second end of the cargo mount is attached to the linear guide via a second rotational device. The cargo loader includes an energy transfer device attached to the second portion of the base and the cargo mount. The energy transfer device may offer resistance in moving the cargo loader from the top of the vehicle to the user's chest level, and offer assistance in moving the cargo loader from the user's chest level to the top of the car.

Accordingly, aspects of the disclosure allow for safe and efficient use of rooftop cargo systems. Cargo systems that allow users to load and unload cargo containers while the users are on the ground and that place the cargo containers at a functional operational position improve the safety for the operators and improve efficiency of user, among other benefits.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

FIG. 1 illustrates a diagram of cargo loader in a mounted position, in accordance with some implementations of the disclosure. System 100 includes cargo loader 101. In implementations, cargo loader 101 includes base 102, linear guide 104, cargo mount 106 with a coupling portion 110, and a cargo box 112. In implementations, the cargo loader 101 is mounted on or attached to a roof of a vehicle 108 via a roof rack 114. In implementations, cargo loader 101 may be directly mounted on or attached to the roof of vehicle 108 in another manner. In other implementations, roof rack 114 may have different components or be configured differently to help facilitate attaching cargo loader 101 to the roof of vehicle 108.

In implementations, base 102 includes a first base portion 102A (also referred to as "first portion" or "base 102A" herein) and a second base portion (also referred to as "second portion" or "base 102B" herein). Base 102 is shown as two separate portions for purposes of illustrations. In other implementations, base portion 102 may be contiguous base or some variation thereof.

In some implementations, cargo loader 101 may use a cargo container, such as cargo box 112. Cargo box 112 is shown for purposes of illustration rather than limitation. Cargo loader 101 may hold one or more types of cargo containers, such as a sports rack that are designed to specifically hold one or more types of sports equipment such as a bicycle, canoe, kayak, surfboard, standup paddle board, skis, snowboard, among others. In implementations, cargo loader 101 may also be used without a cargo container. For example, cargo may be releasably attached to the cargo mount 106 using straps, rope, or other securing devices.

For purposes of illustration, rather than limitation, cargo loader 101 is shown with respect to vehicle 108. Also for purposes of illustration, rather than limitation relative orientation of the cargo loader 101 is described herein. For example, the part of cargo loader 101 pointing left (e.g. driver side) is referred to as an end, first end, or operator end. The part of the cargo loader 101 pointing right (e.g., passenger side) is referred to as a second end. The parts of the cargo loader 101 pointing in front of the car and rear the car may be referred to as first side and second side, respectively. It may be noted that cargo loader 101 may mounted in multiple positions with respect to vehicle 108 in other implementations. For instance, the operator side (e.g., first side) of the cargo loader 101 loader may be pointed in the direction of the rear of the vehicle 108.

Cargo loader 101 is shown in a mounted position (also referred to as "first position" herein). In the mounted position, the linear guide 104 of the cargo loader 101 is parallel the base 102 and the linear guide 104 is unextended. In the mounted position, cargo mount 106 (e.g., bottom portion) is substantially parallel with linear guide 104. As illustrated in subsequent figures, cargo loader 101 may be moved from a mounted position to an extended position (see FIG. 4) (also referred to as a "second position" herein) where the linear guide is extended within a plane (e.g., parallel the roof of the car) defined by the linear guide 104. Cargo loader 101 may be moved from the extended position to a tilted position (see FIG. 7) (also referred to as "third position" herein) where the linear guide 104 may be extended and may rotate about a rotational axis so that the cargo mount 106 and cargo box 112 are positioned directly in front of the operator. It may be noted that operator (also referred to as "user" herein) may generally refer to the person or persons using or moving or operating the cargo loader 101.

It may be noted that "releasably attached" may refer to a type of attachment that may be released by an operator (e.g., user) during operation of the cargo loader 101, such as of the moving the cargo loader 101 to and from the various positions. It may be noted that "attached" may generally refer to a type of attachment that is not readily released by an operator during the operation of cargo loader 101. For instance, base 102 is attached to roof rack 114. Although base 102 may be attached and removed from vehicle 108, base 102 is generally attached and remains attached to roof rack 114 during the operation of cargo loader 101.

It may be noted that cargo loader 101 is described as having particular components. It may be appreciated that some components included in the drawings may not be described in the specification. It may also be noted that cargo loader 101 may include the same, fewer, or additional components arranged in the same or different manner as described herein.

Figure 2:
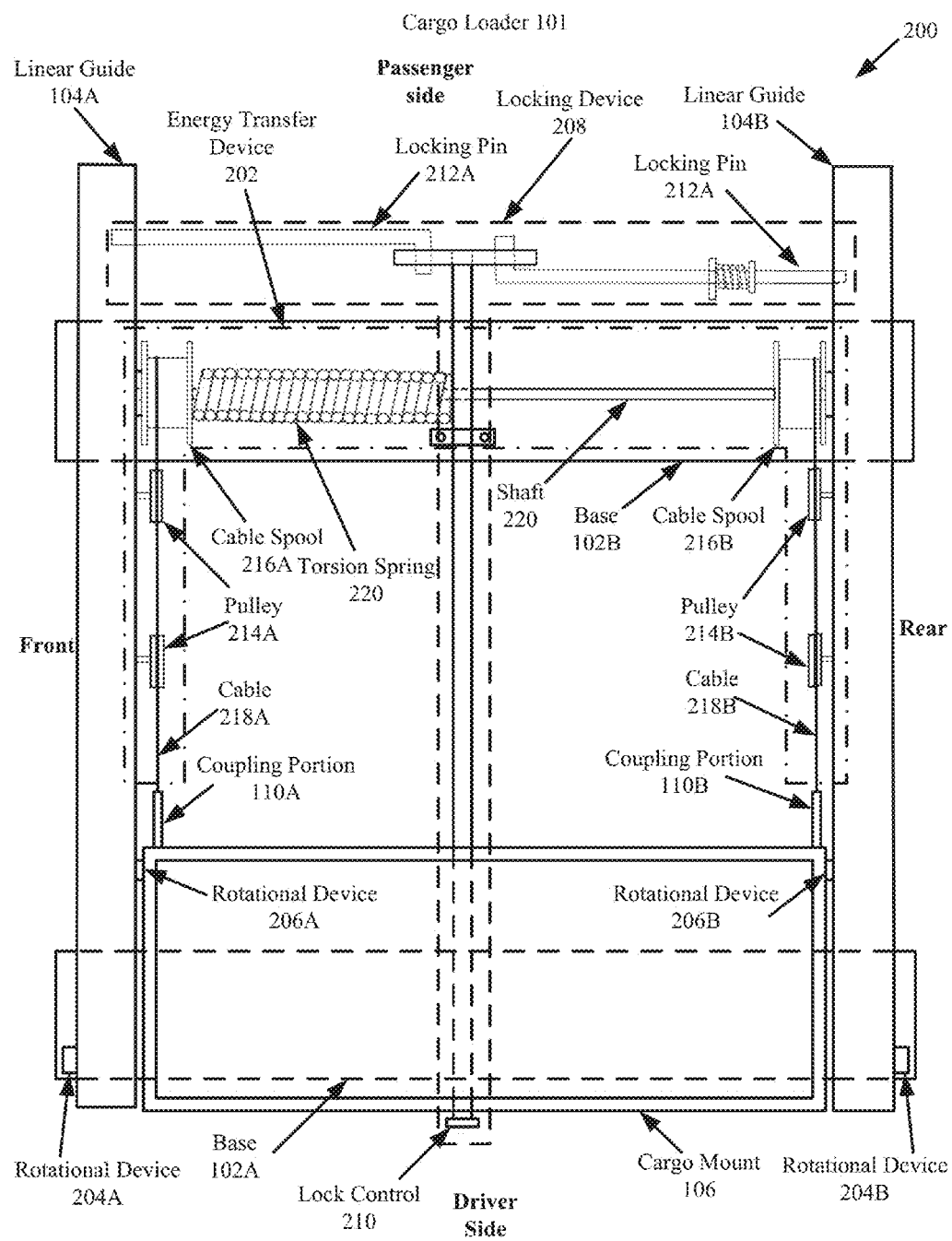
FIG. 2 illustrates a top-down view of cargo loader in a mounted position, in accordance with some implementations of the disclosure.

FIG. 2 illustrates a top-down view of cargo loader in a mounted position, in accordance with some implementations of the disclosure. For the sake of illustration and clarity, in FIG. 2 and subsequent figures, particular components labeled in previous figures may not labeled in subsequent figures, but may be considered included as part of cargo loader 101. Diagram 200 illustrates cargo loader 101 from a top-down perspective.

In implementations, linear guide 104 includes linear guide 104A and linear guide 104B. In some implementations, linear guide 104 includes a first end (e.g. driver side) and a second end (e.g., passenger side). The first end of linear guide 104 is attached to base 102A (e.g., first portion of base 102) and the second end of linear guide 104 is releasably attached to base 102B (e.g., second portion of base 102).

In some implementations, the locking device 208 includes the locking pins 212A and 212B (generally referred to as "locking pins 212") to releasably attach the linear guide 104 to the base 102B. In some implementations, locking pins 212 of locking device 208 may be in a lock position where the locking pins 212 are inserted into linear guide 104A and linear guide 104B to secure linear guide 104 to base 102B (e.g., mounting position of cargo loader 101). In some implementations, locking pins 212 of locking device 208 may be in an unlock position where the locking pins 212 are withdrawn from linear guide 104 allowing the second end of the linear guide 104 to be released from base 102B. In implementations, locking device 208 includes a lock control 210 that allows an operator to move the locking device 208 from a lock position to an unlock position, and vice versa.

In some implementations, a single locking pin 212A or 212B may be used. For example, linear guide 104A and 104B may be attached via a support bar and a single locking pin in linear guide 104A may releasably attach both linear guide 104A and 104B to base 102. Locking device 208 may be further described with respect to FIGS. 9A-9B.

In implementations, the driver side end of linear guide 104 is attached to rotational device 204A and 204B (generally referred to as "rotational device 204"). In some implementations, linear guide 104A is attached to rotational device 204A and linear guide 104B is attached to rotational device 204B. In implementations, rotational device 204 allows linear guide 104 to rotate at an angle to base 102 about a rotational axis (e.g., first rotational axis).

In implementations, cargo loader 101 may include a cargo mount 106. The cargo mount 106 may be used to mount cargo to cargo loader 101. In implementations, cargo mount 106 may include a first end (e.g. driver side) and a second end (e.g., passenger side). The first end of cargo mount 106 may be unattached to the linear guide 104 and the second end of the cargo mount 106 may be attached to the linear guide 104 via rotational device 206A and 2016B (e.g., generally referred to as "rotational device 206"). In implementations, cargo mount 106 includes a coupling portion 110 that connects the cargo mount 106 to energy transfer device 202 and a bottom portion that serves a base for cargo mount 106. In some implementations, cargo mount 106 may include coupling portion 110A and coupling portion 110B (generally referred to as "coupling portion 110"). In some implementations, coupling portion 110 may be a single piece of material (e.g., backing) that is attached to one or more cables 218 at various positions. In other implementations, coupling portion 110 or cargo mount 106 may be may be any shape or size.

In some implementations, cargo loader 101 includes energy transfer device 202. In implementations, the energy transfer device 202 offers resistance responsive to moving the cargo loader 101 from the mounted position to the extended position or from the extended position to tilted position. In some implementations, in offering resistance the energy transfer device 202 converts kinetic energy (e.g., moving the cargo loader 101) to potential energy (e.g., stored in a spring) responsive to moving from the mounted position to the extended position or from the extended position to the tilted position. For example, the energy transfer device 202 may offer some resistance so that heavy cargo placed on cargo mount 106 slowly moves downward from the extended position to the tilted position, which avoids a situation where the cargo does not come crashing down on the operator.

In some implementations, the energy transfer device 202 offers assistance responsive to moving the cargo loader 101 from the tilted position to the extended position or from the extended position to the mounted position. In some implementations, in offering assistance the energy transfer device 202 converts potential energy (e.g., stored from the previous movement to the tilted position) to kinetic energy as the cargo loader 101 moves from the tilted position to the extended position or from the extended position to the mounted position. For example, the energy transfer device 202 may offer some assistance to an operator in moving heavy cargo placed in the cargo mount from chest height to above the head.

In some implementations, energy transfer device 202 may be attached to base 102B and cargo mount 106. In some implementations, energy transfer device 202 may include a shaft 220 attached to base 102B (e.g., using a mounting device that secures the shaft 220 to base 102B and allows shaft 220 to rotate). In implementations, shaft 220 may be mounted parallel the driver side end (and passenger side end) of linear guide 104. In implementations, a torsion spring 220 may be attached to shaft 220. For example, shaft 220 may be inserted into the middle of torsion spring 220. Torsion spring 220 may be secured to the shaft 220 so that the rotation of shaft 220 rotates the torsion spring 220 in the same direction. In implementations, energy transfer device 202 may include cables 218. In some implementations, cables 218 may be fixed-length cables. In implementations, cables 218 may couple the shaft 220 to the cargo mount 106. In implementations, cables 218 may be attached to respective cable spools 216A and 216B (generally referred to as "cable spools 216"). The cables 218 may be wound and unwound on the respective cable spools 216. In implementations, pulleys 214A and pulleys 214B (generally referred to as "pulleys 214") are attached to the inner sides of linear guide 104A and linear guide 104B, respectively. The cables 218 are aligned in a respective vertical plane (parallel the linear guide 104) between shaft 220 and cargo mount 106 via pulleys 214A and pulleys 214B.

In some implementations, torsion spring 220 has a clockwise wind direction (e.g., left-handed torsion spring). In implementations, the torsion spring 220 may be adjusted to handle cargo of different weights. For example, the torsion spring may be wound clockwise or counter clockwise with winding bars or rods to apply or release tension in the torsion spring 220.

It may be noted that energy transfer device 202 may include the same, more, or fewer components in some implementations. For example, in some implementations, energy transfer device 202 may use a single cable spool 216 or a single pulley 214 (e.g., one or more pulleys of pulley 214A). In other implementations, torsion spring 220 may be replaced with a wind-up style spring. In some implementations, the torsion spring 220 may be replaced with 2 lengths of elastic tubing. In some implementations, torsion spring 220 may be removed and cables 218 are fixed length cables that allow cargo mount 106 to tilt up responsive to moving cargo loader 101 to the tilted position. A counter weight may be applied to the second end (e.g., passenger side) to assist an operator in moving cargo loader 101 from the tilted position to the extended position.

Figure 3:
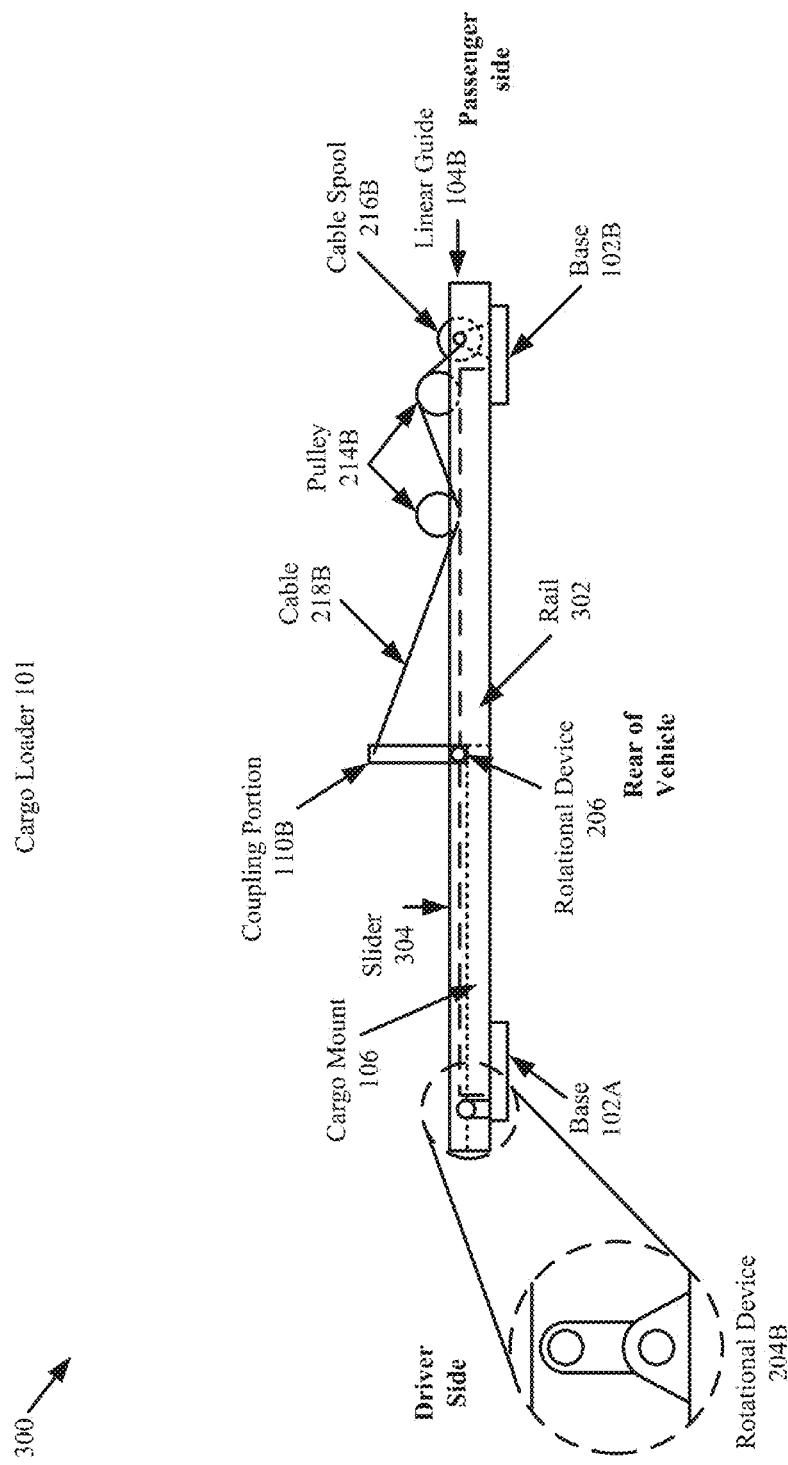
FIG. 3 illustrates a side-view of cargo loader in a mounted position, in accordance with some implementations of the disclosure.

FIG. 3 illustrates a side-view of cargo loader in a mounted position, in accordance with some implementations of the disclosure. Diagram 300 illustrates a side-view (from the rear of vehicle 108) of cargo loader 101 in the mounted position. A linear guide 104, such as linear guide 104B, may include a rail 302 and a slider 304. In implementations, slider 304 is located above the rail 302 and allowed to slide on rail 302. For instance, the slider 304 may be free to move (e.g., if not locked) in a linear direction along a first plane. The first plane may be a plane defined by linear guide 104A and 104B. For example, slider 304 may move in the direction of the driver side and back in the direction of the passenger side when cargo loader 101 is in an unlock position. In implementations, pulleys 214B may be attached to the slider 304.

It may be noted that pulleys 214B are drawn as centered above linear guide 104B for purposes of illustration, rather than limitation. In implementations, pulleys 214B maybe centered on linear guide 104B. It may also be noted that pulleys 214B allow for an angle between the coupling portion 110B and the pulley closest to coupling portion 110B so that the cargo mount 106 may be tilted upwards responsive to the cargo loader 101 moving to the tilted position. In may also be noted that the components on the opposite side (e.g., front of the car) of cargo loader 101 (e.g., linear guide 104A, etc.) may be configured in a similar manner the components illustrated in FIG. 3.

It may be noted that rotational device 204B is shown in an expanded view. In implementations, the lower circular feature defines the rotational axis where the linear guide 104 is allowed to rotate from the extended position to the tilted position, and vice versa. The upper circular feature illustrates a mounting component to mount the linear guide 104 to the rotational device 204B. In implementations, the upper circular feature does not rotate and is fastened to linear guide 104 (e.g., rail 302). In other implementations, the upper circular feature may also allow rotation of linear guide 104.

Figure 4:
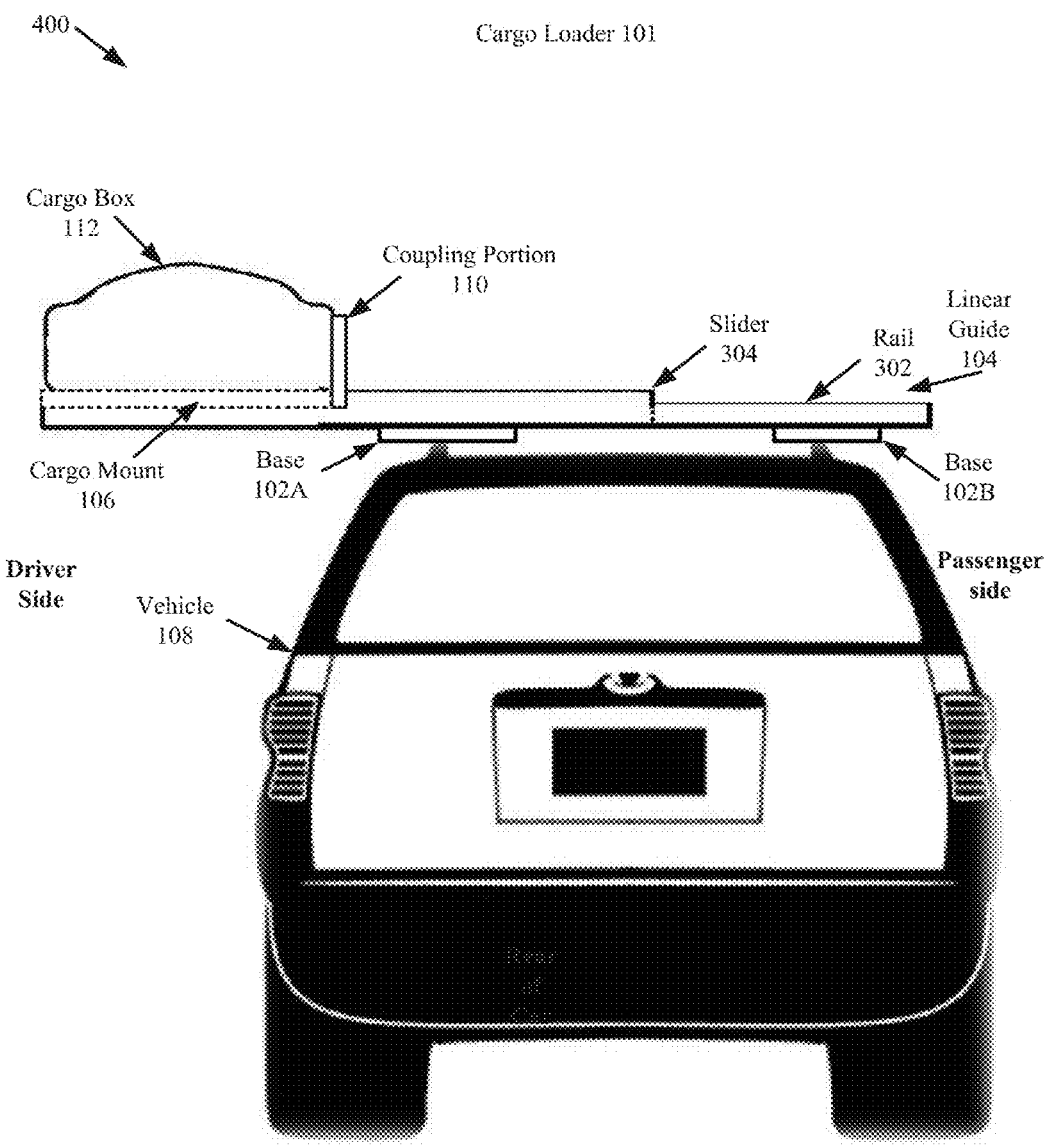
FIG. 4 illustrates a diagram of cargo loader in an extended position, in accordance with some implementations of the disclosure.

FIG. 4 illustrates a diagram of cargo loader in an extended position, in accordance with some implementations of the disclosure. Diagram 400 illustrates cargo loader 101 mounted on vehicle 108 and in an extended position. In the extended position, the linear guide 104 is parallel the base 102 and the linear guide 104 is extended towards the driver side (e.g., first end of the linear guide 104). In the extended position, cargo mount 106 is substantially parallel with linear guide 104. In implementations, the cargo loader 101 moves from the mounted position to the extended position or from the extended position to the mounted position or to the tilted position. It may be noted that in implementations cargo loader 101 may be held in the extended position with cargo on cargo mount 106 (without rotating down) using the resistance provided by energy transfer device 202 or counter balance techniques.

Figure 5:
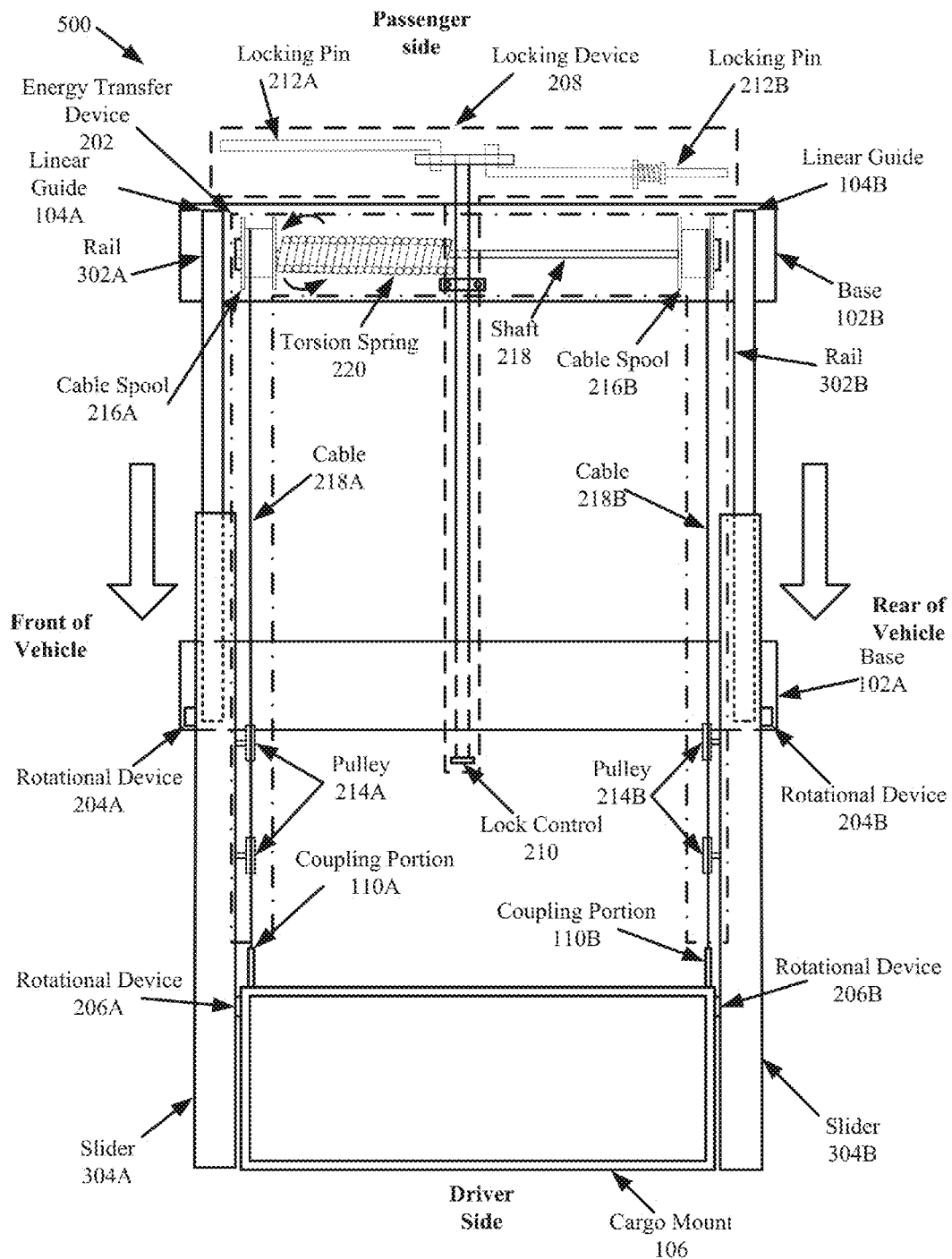
FIG. 5 illustrates a top-down view of cargo loader in an extended position, in accordance with some implementations of the disclosure.

FIG. 5 illustrates a top-down view of cargo loader in an extended position, in accordance with some implementations of the disclosure. Diagram 500 illustrates cargo loader 101 in an extended position where the linear guide 104 is parallel the base 102 and is extended towards the driver side. In may be noted that locking device 208 is in an unlock position to allow cargo loader 101 to move from a mounted position to the extended position. The linear guide 104 is shown having a rail 302A and 302B (generally referred to as "rail 302") and a slider 304A and 304B (generally referred to as "slider 304") that slides above the respective rail 302. In implementations, linear guide 104A and 104B are orientated in parallel and define a first plane. In implementations, the first slider 304A is above the first rail 302A. The second slider 304B is above the second rail 302B. In implementations, pulleys 214 are attached to respective sliders 304 and move as the respective sliders move. In implementations, the cable spools 216, shaft 220, torsion spring 220 remain attached to base 102B while cargo loader 101 is moved to and from the various positions. In implementations, the extension of linear guide 104 causes the torsion spring 220 to rotate in a counter clockwise manner so that torsion spring 220 is offering resistance and converting kinetic energy to potential energy.

Figure 6:
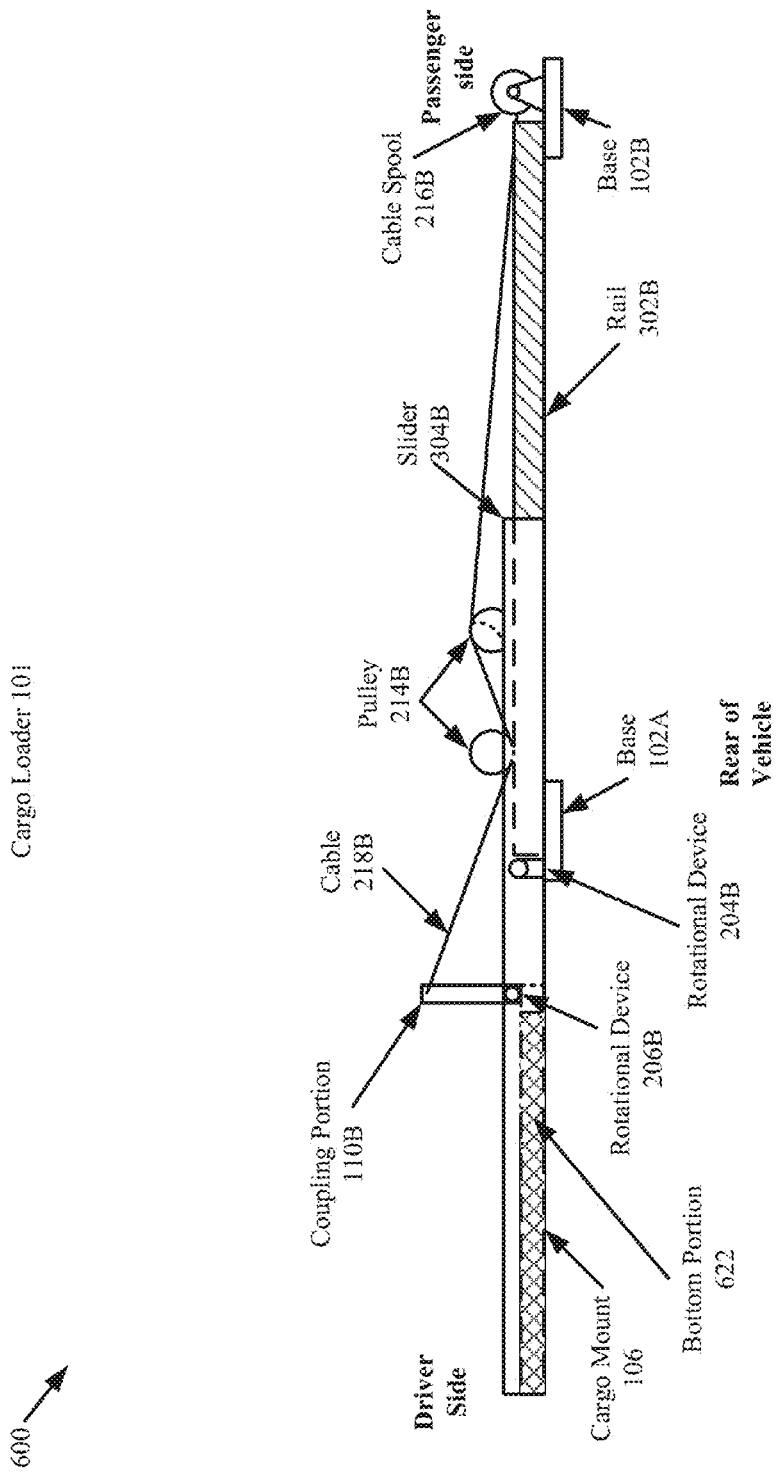
FIG. 6 illustrates a side-view of cargo loader in an extended position, in accordance with some implementations of the disclosure.

FIG. 6 illustrates a side-view of cargo loader in an extended position, in accordance with some implementations of the disclosure. Diagram 600 illustrates a side-view of cargo loader 101 from the rear of vehicle 108. Cargo loader 101 is shown in the extended position. In implementations, cargo mount 106 includes a bottom portion 622 and a coupling portion 110 that is oriented vertical to the bottom portion 622. As illustrated, cable 218B extends as slider 304B is extended. Cable 218B may unravel from cable spool 216B. It may be noted that rail 302B may rest on base 102B, but may be unattached to base 102B (e.g., unlock position). In may also be noted that components of cargo loader 101 on the opposite side (e.g., front of the car) may be configured in a similar manner as components illustrated in FIG. 6.

Figure 7:
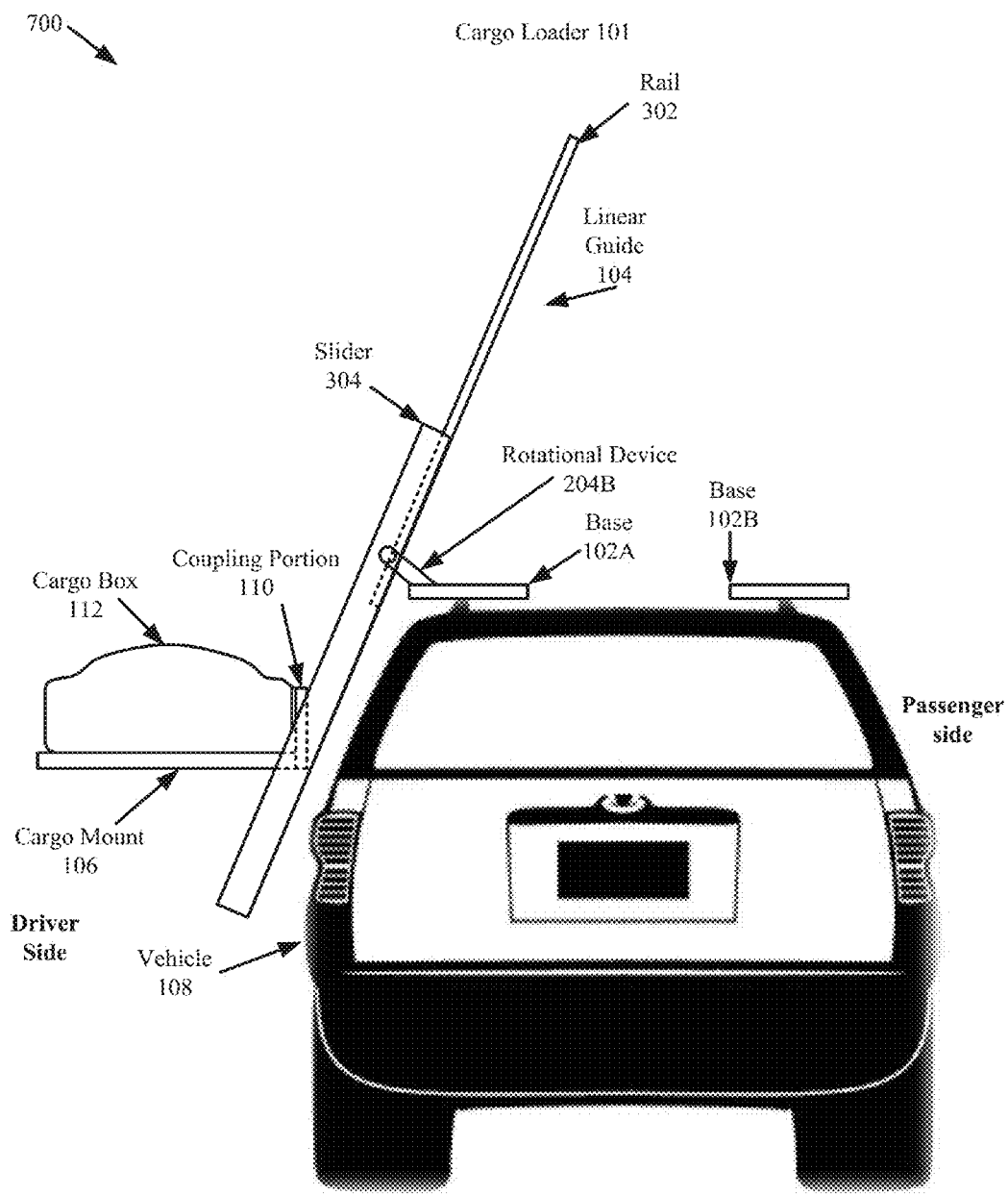
FIG. 7 illustrates a diagram of cargo loader in a tilted position, in accordance with some implementations of the disclosure.

FIG. 7 illustrates a diagram of cargo loader in a tilted position, in accordance with some implementations of the disclosure. Diagram 700 illustrates cargo loader 101 mounted on vehicle 108 and in a tilted position. In a tilted position, the linear guide 104 is extended and the linear guide 104 is rotated at an angle to base 102. Linear guide 104 rotates about a first rotational axis via rotational device 204 (e.g., rotational device 204A and 204B). In implementations, in the tilted position the cargo mount 106 is rotated about second rotational axis via rotational device 206. The first rotational axis and the second rotational axis are parallel. The cargo mount 106 is rotated in an opposite direction (e.g., clockwise) than the linear guide 104 (e.g., counter clockwise) responsive to moving to and from the extended position and the tilted position. As illustrated, the cargo box 112 is presented in front of an operator so the operator may easily load and unload cargo. In implementations, the cargo loader 101 moves from the extended position to the tilted position, and vice versa.

Figure 8:
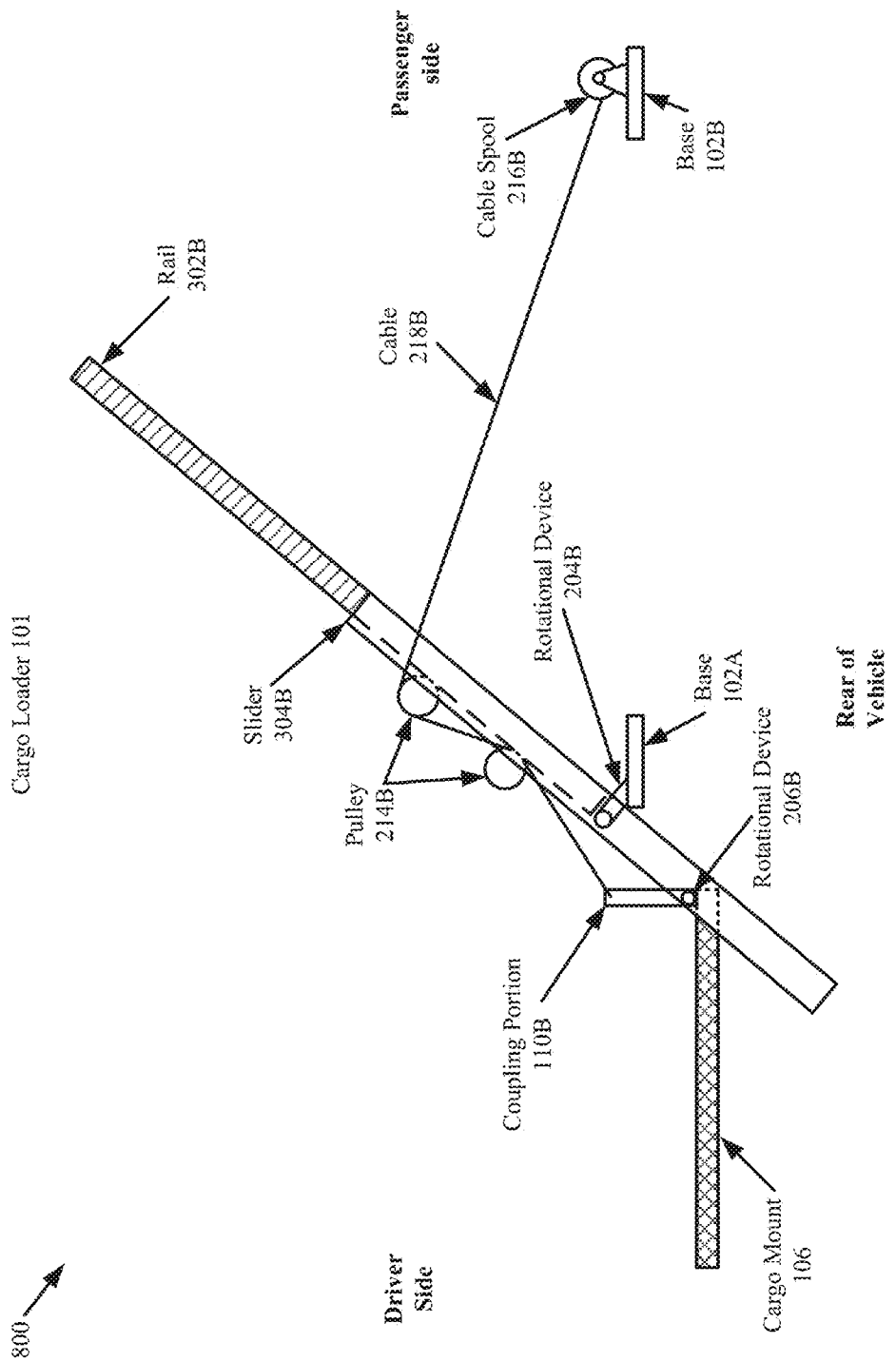
FIG. 8 illustrates a side-view of cargo loader in a tilted position, in accordance with some implementations of the disclosure.

FIG. 8 illustrates a side-view of cargo loader in a tilted position, in accordance with some implementations of the disclosure. Diagram 800 illustrates a side-view of cargo loader 101 from the rear of vehicle 108. Cargo loader 101 is shown in the tilted position. As illustrated, cable 218A extends as slider 304 is extended or linear guide 104 is tilted. In implementations, a fixed length cable 218B is pulled taut. In some implementations, cable 218B (fixed-length or otherwise) is pulled by the tension from the torsion spring 220. In both cases, cable 218B pulls cargo mount 106 upwards and approximately level with the ground. Rail 320B is detached from base 102B and allowed to pivot on rotational device 204B at base 102A. In may also be noted that components of cargo loader 101 on the opposite side (e.g., front of the car) of cargo loader 101 (e.g., linear guide 104A, etc.) may be configured in a similar manner to components illustrated in FIG. 8.

Figure 9A:
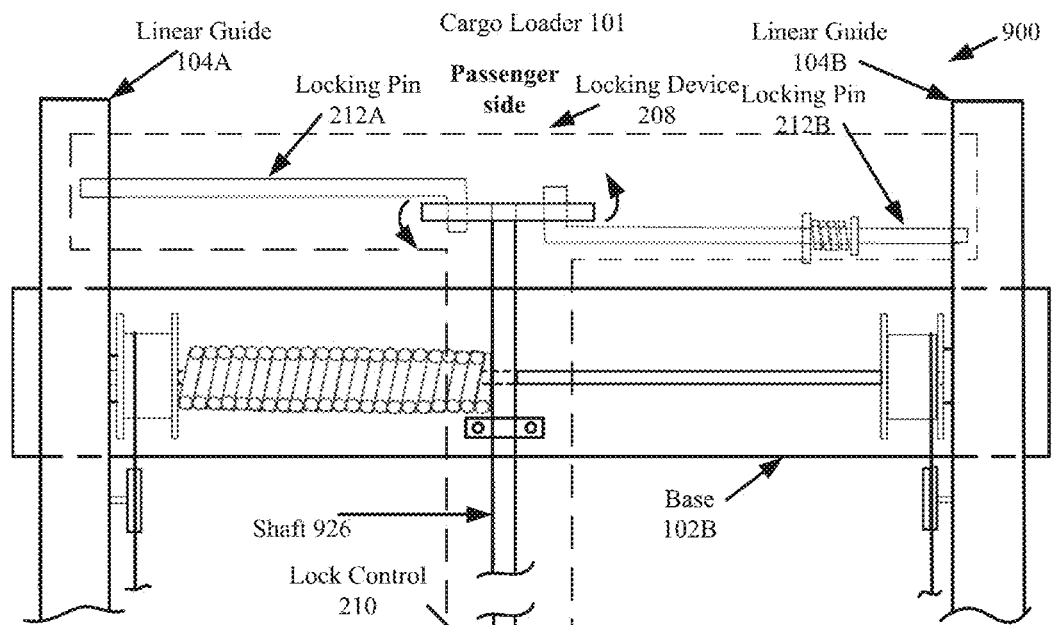
FIG. 9A illustrates a top-down view of cargo loader in a lock position, in accordance with some implementations of the disclosure.
Figure 9B:
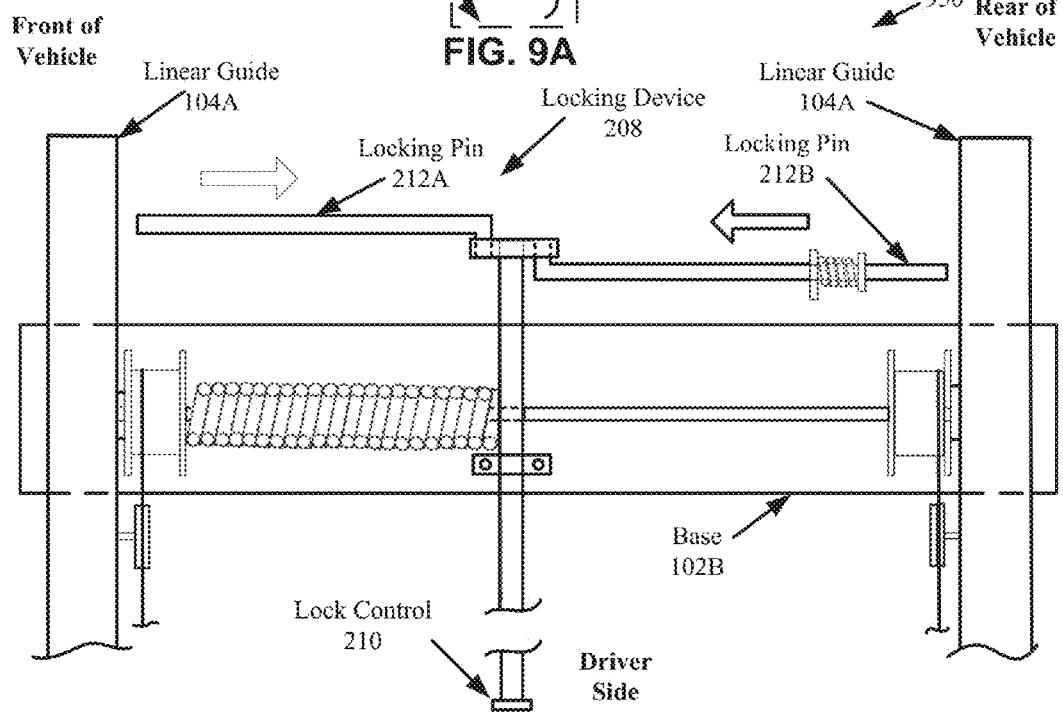
FIG. 9B illustrates a top-down view of cargo loader in a unlock position, in accordance with some implementations of the disclosure.

FIG. 9A illustrates a top-down view of cargo loader in a lock position, in accordance with some implementations of the disclosure. FIG. 9B illustrates a top-down view of cargo loader in an unlock position, in accordance with some implementations of the disclosure. Diagram 900 shows locking device 208 in a lock position. In a lock position, the linear guide 104 is secured to base 102B via locking device 208 and the linear guide 104 cannot extend or rotate about a rotational axis via rotational device 204. In implementations, the locking device 208 includes a lock control 210 located below the first end of the linear guide 104. In some implementations, the lock control 210 is below the cargo mount 106 and accessible to an operator of cargo loader 101. The lock control is operatively coupled to the locking pins 212.

In implementations, lock control 210 may be rotated in a clockwise direction (or counterclockwise direction) to release locking pins 212 from linear guide 104. In implementations, the lock control 210 is attached to a shaft 926 that is suitably mounted via a mounting device to base 102B. On the opposite end of shaft 926 is an attached bracket that is directly coupled to the locking pins 212. Responsive to the rotation of shaft 926 in a clockwise direction, the locking pins 212 are withdrawn from linear guide 104. In implementations, a spring may be implemented on one or more of locking pins 212 to assist reinsertion of the locking pins 212 into linear guide 104.

Diagram 950 shows locking device 208 in an unlock position. In implementations, responsive to rotating lock control 210 the locking pins 212 are withdrawn from linear guide 104. In an unlock position, the sliders of linear guide 104 are allowed to extend and linear guide 104 is allowed to rotate along the first rotational axis at base 102A.

It may be noted that locking device 208 may have the same, more, or fewer components configured in the same or different manner as illustrated in FIGS. 9A-9B. It may be noted that locking device 208 may be implemented in different ways to perform the above described functions.

It may be noted that cargo loader 101 may be provided as part of kit, where one or more components of the cargo loader 101 are provided and the components may be assembled to form cargo loader 101 as described herein.

Figure 10:
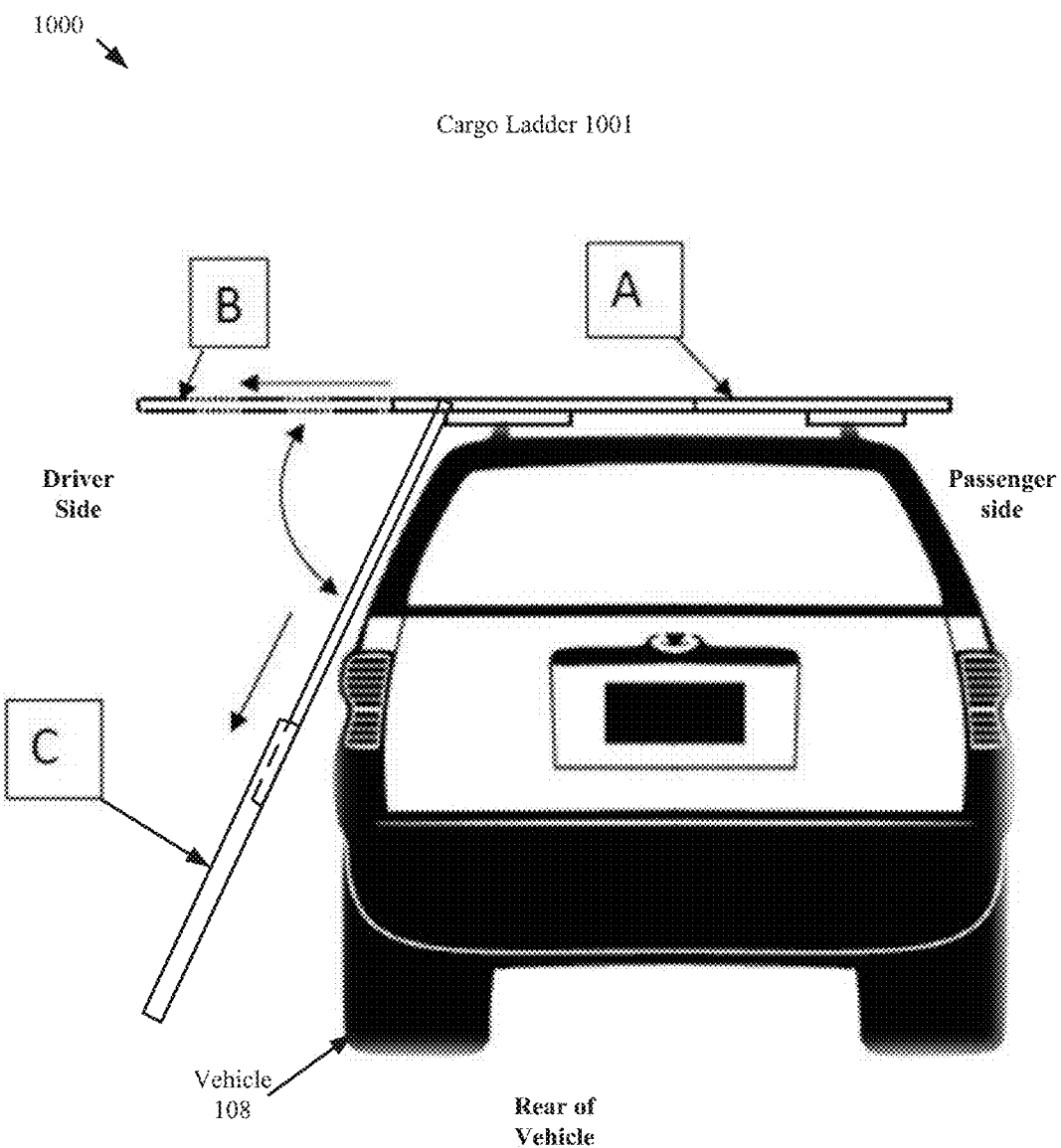
FIG. 10 illustrates a diagram of cargo ladder in a multiple position, in accordance with some implementations of the disclosure.

FIG. 10 illustrates a diagram of cargo ladder in a multiple position, in accordance with some implementations of the disclosure. Diagram 1000 shows cargo ladder 1001 in positions A, B, and C. In implementations, cargo ladder 1001 may be used to access conventional cargo boxes that are fixed to the roof, used to access the roof of vehicle 108, or used with cargo loader 101. For example, cargo ladder 1001 may be mounted on a roof rack and under a conventional cargo container, such as cargo box, or under cargo loader 101.

Position A of cargo ladder 1001 shows cargo ladder 1001 mounted (or in a lock position) on the top of vehicle 108. In position B, cargo ladder 1001 (at least the ladder portion) is slid towards the driver side, and in position C cargo ladder 1001 is extended downwards (e.g., telescopically) and is available to an operator for use. For example, in position A the ladder of cargo ladder 1001 is locked and mounted on the roof of vehicle 108. Wheels (or other device) may be attached to the ends of the ladder (e.g., on the passenger side) and allow the ladder to slide to position B. For instance, the wheels of the ladder of cargo ladder 1001 may reside inside channels where the channels are attached to the roof of vehicle 108. In implementations, the ladder may be a telescopic ladder having a retracted state and extended state. In position B, the ladder may be slid to position B and be in the retracted state. In moving from position B to position C, the ladder may pivot or rotate down while the channels remain secured to the base. In position C, the ladder may be moved to an extended state where the rails and rungs of the ladder extend towards the ground. It implementations, cargo ladder 1001 may move from position A to position B and from position B to position C, and return to position A in a respective inverse order.

For purposes of illustration, rather than limitation, cargo ladder 1001 is shown with respect to vehicle 108. Also for purposes of illustration, rather than limitation relative orientation of the cargo ladder 1001 is described herein. For example the part of cargo ladder 1001 pointing left is referred to as a driver side, end, or operator end. The part of the cargo ladder 1001 pointing right is referred to as passenger side or end. The parts of the cargo ladder 1001 pointing in front of the car and rear the car may be referred to as a side, such as front side or back side, respectively. It may be noted that cargo ladder 1001 may be mounted in multiple positions with respect to vehicle 108 in other implementations. For instance, the operator side (e.g., first side) of the cargo ladder 1001 may be pointed in the direction of the rear of the vehicle 108.

Figure 11:
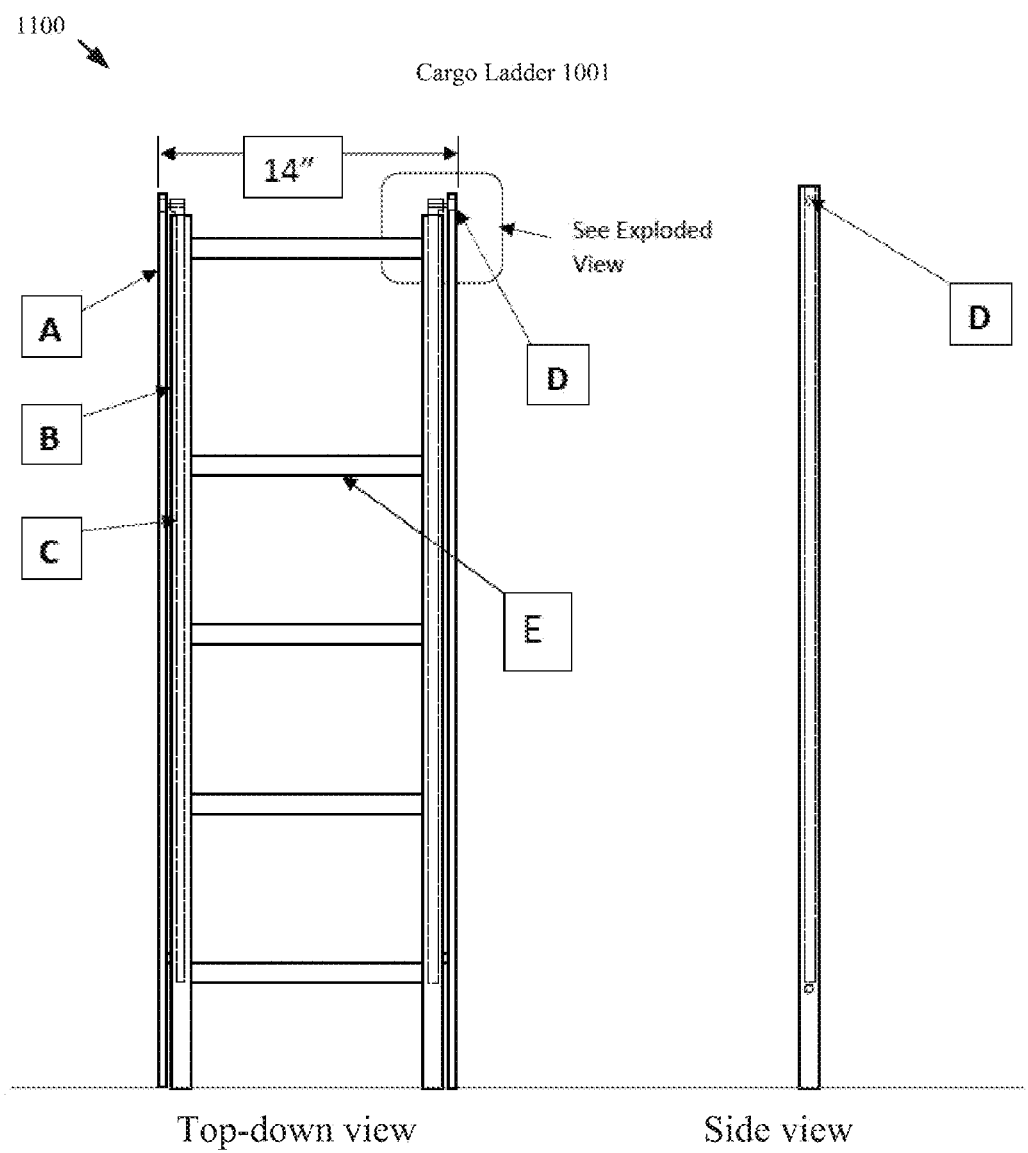
FIG. 11 illustrates a top-down view and side view of cargo ladder, in accordance with some implementations of the disclosure.

FIG. 11 illustrates a top-down view and side view of cargo ladder, in accordance with some implementations of the disclosure. Diagram 1100 shows cargo ladder 1001 in position A in both a top-down view and a side view. Component A shows a channel or rail, such as a C-channel, to allow sealed ball bearings or nylon blocks or wheels or other device to move on or within component A. In implementations, channels are attached to the base 102 that is further attached to a roof rack. In implementations, component B is a ladder rail. In implementations, component C is an inner tubing. In implementations, component D is a sealed ball bearing or nylon block or other device. In implementations, component E is a ladder rung. It may be noted that one or more of the components described herein with respect to cargo ladder 1001 may be duplicated on both sides of cargo ladder 1001, as illustrated. It may be noted that any dimensions illustrated or otherwise described herein are for purposes of illustration, rather than limitation. In implementations, ladder of cargo loader 101 is a telescopic ladder where the ladder rails (component B) extend downward around the inner tubing (component C) in position C.

Figure 12:
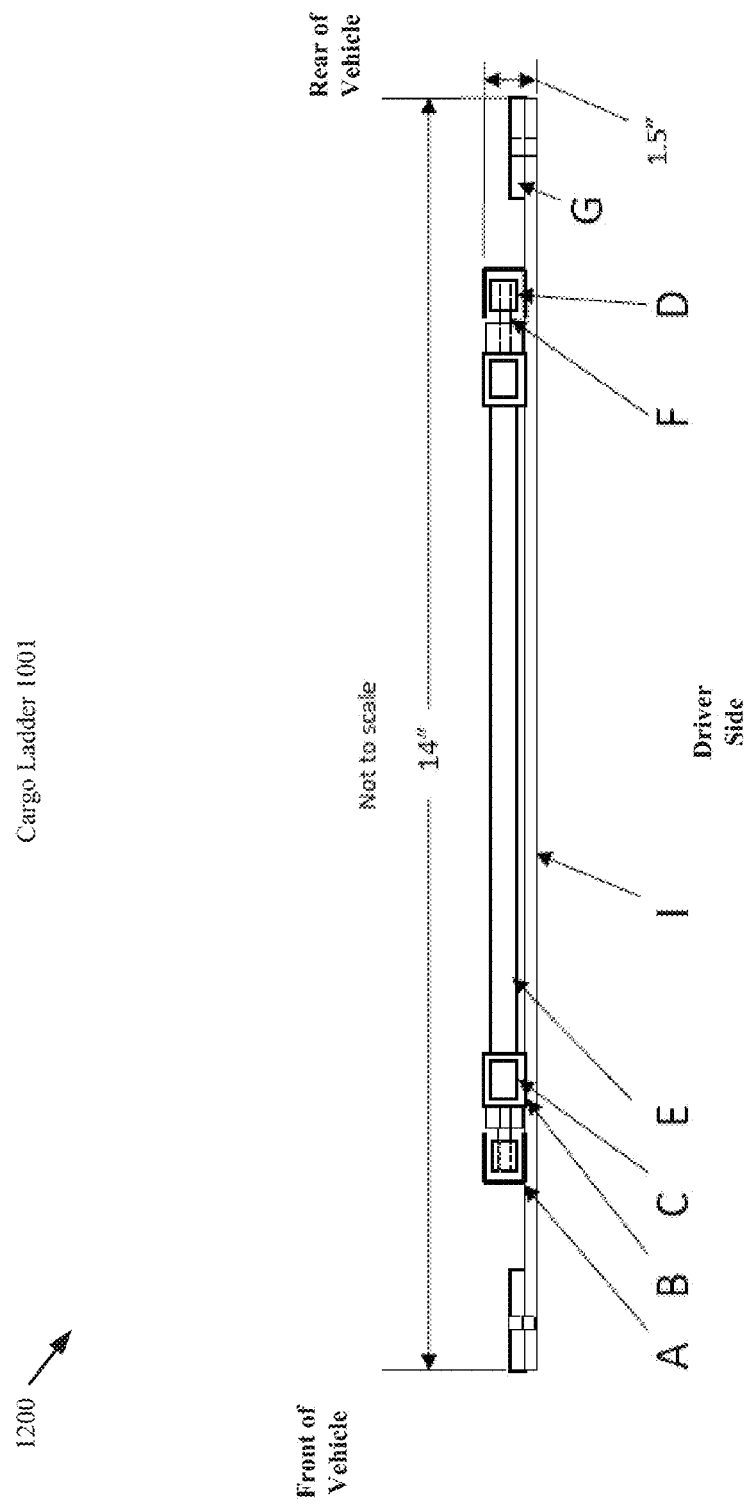
FIG. 12 illustrates an end view of cargo ladder, in accordance with some implementations of the disclosure.

FIG. 12 illustrates an end view of cargo ladder, in accordance with some implementations of the disclosure. Diagram 1200 shows cargo ladder 1001 from an end-view from the perspective of an operator. Component A illustrates a channel, wherein within the channel is component D. Component D, such as sealed ball bearings or a nylon block, allows the ladder to be extended in a plane defined by components A and in the direction of the driver side. In implementations, component F is pin that attaches component D to component C (e.g., the inner tubing). In implementations, component B is a ladder rail and component E is a ladder rung. In implementations, component C is inner tubing, such as inner square tubing. In implementations, component I is a base 102 portion. In implementations, a separate base portion may be attached to both racks of a roof rack in a similar manner as described with respect to cargo loader 101. In implementations, component G is a mounting bracket to attach the base to the roof rack.

Figure 13:
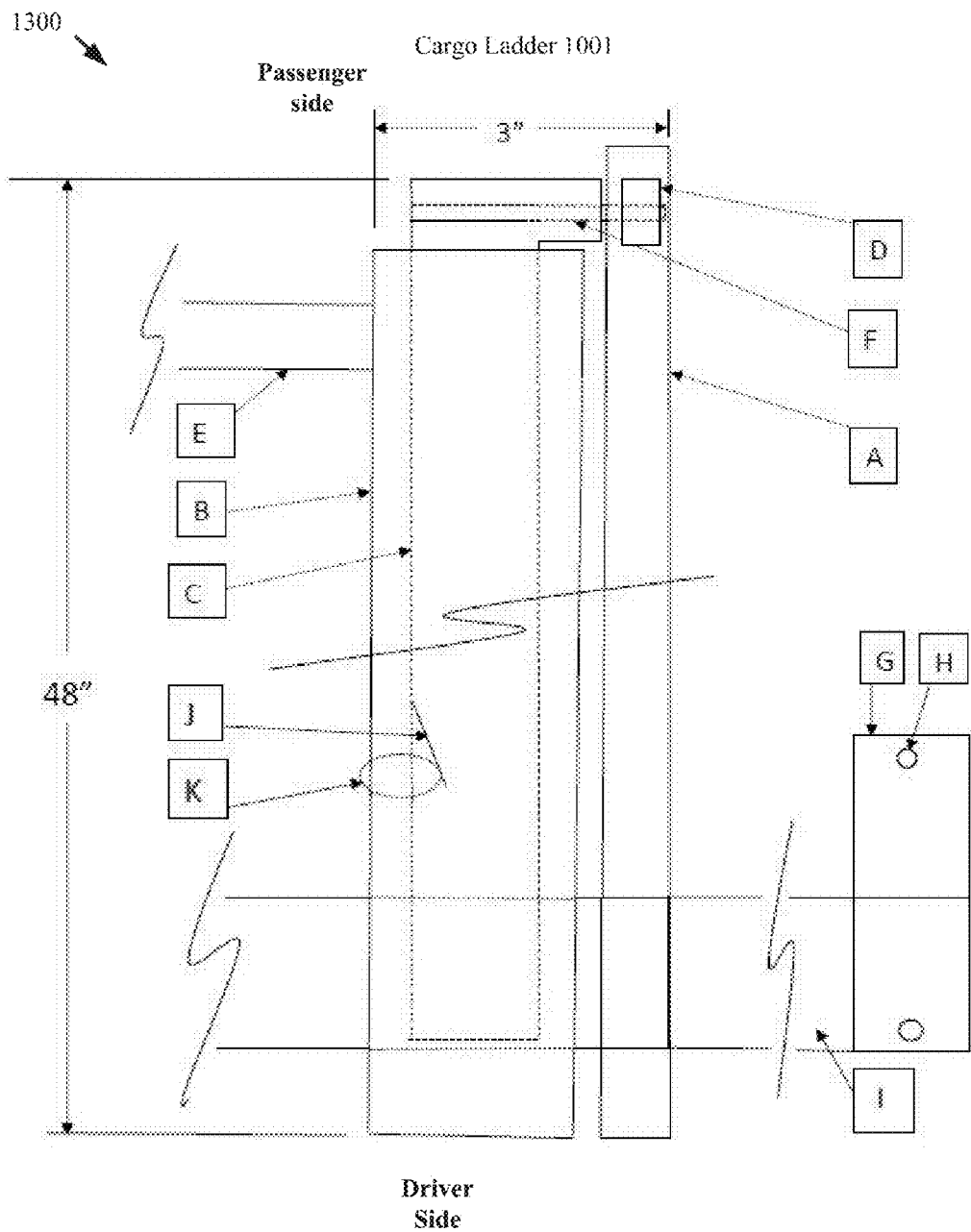
FIG. 13 illustrates an exploded view of an end of cargo ladder, in accordance with some implementations of the disclosure.

FIG. 13 illustrates an exploded view of an end of cargo ladder, in accordance with some implementations of the disclosure. Diagram 1300 shows an exploded view (see FIG. 11) of an end of the cargo ladder 1001 (passenger side). Component D shows a ball bearing in a C-channel (e.g., component A). Component D allows the ladder of cargo ladder 1001 to slide or move in the C-channel. For example, the ladder in a retracted state may be slid from position A to position B by the ball bearings moving within the C-channel. Component F shows a pin that connects component D to the ladder (e.g., inner tubing). In implementations, the pin attaches the ladder to the C-channel and allows the ladder to pivot downwards from position B to position C or pivot upwards from position C to position B. As illustrated, component C (inner tube) is located within component B (ladder rails) and enables the ladder to telescope at position C. For example, the ladder rails and rungs may extend downward by sliding along the inner tubing.

In implementations, cargo ladder 1001 includes components J and K. In implementations, component J may be a spring and component K may be a pin or dowel attached to the end of the spring. In implementations, component K may be pressed by an operator to release the ladder rails and rungs from the inner tubing (e.g., move from a retracted state to an extended state). For instance, in position C, the operator may press component K to release the lower portion (e.g., rails and rungs) of the ladder to the ground. In implementations, component H may be mounting holes for U-bolts, for example. In still other implementations, cargo ladder 1001 may include a locking device (not shown) that allows cargo ladder 1001 to be locked in position A and allows an operator to unlock cargo ladder 1001 to move from position A to position B.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

The words "example" or "exemplary" or "instance" are used herein to mean serving as an example, instance, or illustration. Any aspect or design described herein as "example" or "exemplary" or "instance" is not necessarily to be construed as preferred or advantageous over other aspects or designs. Rather, use of the words "example" or "exemplary" or "instance" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A rooftop cargo loader comprising:
   a base comprising a first portion and a second portion, the base suitable to attach to a roof of a vehicle;
   a linear guide comprising a first end and a second end, wherein the first end of the linear guide is attached to the first portion of the base via a first rotational device, wherein the second end of the linear guide is releasably attached to the second portion of the base;
   a cargo mount comprising a first end and a second end, wherein the first end of the cargo mount is unattached to the linear guide, wherein the second end of the cargo mount is attached to the linear guide via a second rotational device; and
   an energy transfer device attached to the second portion of the base and the cargo mount, wherein the energy transfer device offers resistance and converts kinetic energy into potential energy responsive to the rooftop cargo loader moving from a mounted position to an extended position and from the extended position to a tilted position, wherein the energy transfer device offers assistance and converts potential energy into kinetic energy as the rooftop cargo loader moves from the tilted position to the extended position and from the extended position to the mounted position.

2. The rooftop cargo loader of claim 1, wherein in the mounted position of the rooftop cargo loader the linear guide is parallel to the base and the linear guide is unextended.

3. The rooftop cargo loader of claim 2, wherein in the extended position of the rooftop cargo loader the linear guide is parallel to the base and the linear guide is extended in a first direction towards the first end of the linear guide.

4. The rooftop cargo loader of claim 3, wherein in the tilted position of the rooftop cargo loader the linear guide is extended in the first direction towards the first end of the linear guide and the linear guide is rotated at an angle to the base about a first rotational axis via the first rotational device.

5. The rooftop cargo loader of claim 4, wherein in the mounted position and the extended position the cargo mount is substantially parallel with the linear guide, wherein in the tilted position the cargo mount is rotated about a second rotational axis via the second rotational device, wherein the first rotational axis and the second rotational axis are parallel, and wherein the cargo mount is rotated in an opposite direction than the linear guide.

6. The rooftop cargo loader of claim 5, wherein the rooftop cargo loader moves from at least one of the mounted position to the extended position, from the extended position to the tilted position, from the tilted position to the extended position, or from the extended position to the tilted position.

7. The rooftop cargo loader of claim 1, further comprising:
   a cargo container or a sports rack releasably attached to the cargo mount.

8. The rooftop cargo loader of claim 1, further comprising:
   a locking device attached to the second portion of the base, wherein the locking device comprises a locking pin to releasably attach the linear guide to the base, wherein in a lock position of the locking device the locking pin is inserted into the linear guide, wherein in an unlock position of the locking device the locking pin is withdrawn from the linear guide.

9. The rooftop cargo loader of claim 8, wherein the locking device comprises a lock control located below the first end of the linear guide, wherein the lock control is operatively coupled to the locking pin.

10. The rooftop cargo loader of claim 1, further comprising:
    a roof rack to attach to the roof of the vehicle, wherein the base is attached to the roof rack.

11. The rooftop cargo loader of claim 1, wherein the linear guide comprises:
    a first rail;
    a second rail, wherein the first rail and the second rail are orientated in parallel in a first plane;
    a first slider above the first rail; and
    a second slider above the second rail, wherein the first slider and the second slider move in a linear direction along the first plane.

12. The rooftop cargo loader of claim 1, wherein the cargo mount comprises a bottom portion and a coupling portion that is orientated vertical to bottom portion, wherein the cargo mount is coupled to the energy transfer device via the coupling portion.

13. The rooftop cargo loader of claim 1, wherein the energy transfer device comprises:
    a shaft attached to the second portion of the base, wherein the shaft is parallel the first end of the linear guide;
    a torsion spring attached to the shaft; and
    a first cable coupling the shaft with the cargo mount.

14. The rooftop cargo loader of claim 13, wherein the torsion spring has a clockwise wind direction.

15. The rooftop cargo loader of claim 13, wherein the energy transfer device further comprises:
    a first cable spool attached to the shaft and coupled to the first cable; and
    a first plurality of pulleys attached to a first side of the linear guide, wherein the first cable is aligned with a first vertical plane between the shaft and the cargo mount via the first plurality of pulleys.

16. The rooftop cargo loader of claim 15, wherein the energy transfer device further comprises:
    a second cable coupling the shaft with the cargo mount via a second cable spool; and
    a second plurality of pulleys attached to a second side of the linear guide, wherein the second cable is aligned with a second vertical plane between the shaft and the cargo mount via the second plurality of pulleys.

17. A kit for installing a rooftop cargo loader comprising:
    a base comprising a first portion and a second portion, the base suitable to attach to a roof of a vehicle;
    a linear guide comprising a first end and a second end, wherein the first end of the linear guide is to attach to the first portion of the base via a first rotational device, wherein the second end of the linear guide is to releasably attach to the second portion of the base;

a cargo mount comprising a first end and a second end, wherein the first end of the cargo mount is to remain unattached to the linear guide, wherein the second end of the cargo mount is to attach to the linear guide via a second rotational device; and an energy transfer device to attach to the second portion of the base and the cargo mount, wherein the energy transfer device to offer resistance and to convert kinetic energy into potential energy responsive to the rooftop cargo loader moving from a mounted position to an extended position and from the extended position to a tilted position, wherein the energy transfer device to offer assistance and to convert potential energy into kinetic energy as the rooftop cargo loader moves from the tilted position to the extended position and from the extended position to the mounted position.

18. The kit of claim 17, further comprising:

a locking device to attach to the second portion of the base, wherein the locking device comprises a locking pin configured to releasably attach the linear guide to the base, wherein in a lock position of the locking device the locking pin is to insert into the linear guide, wherein in an unlock position of the locking device the locking pin is to withdraw from the linear guide.

19. A rooftop cargo loader comprising:

a base comprising a first portion and a second portion, the base suitable to attach to a roof of a vehicle;

a linear guide comprising a first end and a second end, wherein the first end of the linear guide is attached to the first portion of the base via a first rotational device, wherein the second end of the linear guide is releasably attached to the second portion of the base;

a cargo mount comprising a first end and a second end, wherein the first end of the cargo mount is unattached to the linear guide, wherein the second end of the cargo mount is attached to the linear guide via a second rotational device; and an energy transfer device attached to the second portion of the base and the cargo mount, the energy transfer device comprising:

a shaft attached to the second portion of the base, wherein the shaft is parallel the first end of the linear guide, a torsion spring attached to the shaft, and a first cable coupling the shaft with the cargo mount.

20. The rooftop cargo loader of claim 19, wherein the energy transfer device offers resistance and converts kinetic energy into potential energy responsive to the rooftop cargo loader moving from a mounted position to an extended position and from the extended position to a tilted position, wherein the energy transfer device offers assistance and converts potential energy into kinetic energy as the rooftop cargo loader moves from the tilted position to the extended position and from the extended position to the mounted position.

* * * * *